United States Patent [19]
Perreault

[11] 3,986,397
[45] Oct. 19, 1976

[54] FLUID FLOW CONTROL SYSTEM

[75] Inventor: Henry W. Perreault, Chelmsford, Mass.

[73] Assignee: Raytheon Company, Lexington, Mass.

[22] Filed: Aug. 18, 1975

[21] Appl. No.: 605,494

Related U.S. Application Data

[63] Continuation of Ser. No. 408,985, Oct. 23, 1973, abandoned.

[52] U.S. Cl. .......................... 73/193 R; 137/625.16; 137/625.47
[51] Int. Cl.² ........................................... G01K 17/10
[58] Field of Search ............... 73/193; 137/625.11, 137/625.16, 625.29, 625.47

[56] References Cited
UNITED STATES PATENTS

| | | | |
|---|---|---|---|
| 1,358,862 | 11/1920 | McArthur | 136/625.16 |
| 2,830,564 | 4/1958 | Bryant | 137/625.11 |
| 3,411,538 | 11/1968 | Gruner et al. | 137/625.29 |
| 3,537,311 | 11/1970 | Bornstein | 73/193 |
| 3,773,078 | 11/1973 | Suntheimer | 137/625.11 |

Primary Examiner—Herbert Goldstein
Attorney, Agent, or Firm—John T. Meaney; Joseph D. Pannone; Harold A. Murphy

[57] ABSTRACT

A fluid flow system including a pressurized fluid source operatively connected through a uni-adjustment flow dividing valve to a plurality of loads, the valve comprising a hollow housing having movably disposed therein a channelled member which provides means for simultaneously adjusting the flow of fluid from the source to each of the respective loads in a smooth transitional manner.

5 Claims, 11 Drawing Figures

FLUID FLOW CONTROL SYSTEM

CROSS-REFERENCE TO RELATED CASES

This is a continuation of application Ser. No. 408,985, filed Oct. 23, 1973, now abandoned.

BACKGROUND OF THE INVENTION

This invention relates generally to fluid flow control systems and is concerned more particularly with a calorimetric measuring system having means for maintaining a uniform flow of fluid through a calorimetric load.

A fluid flow system generally includes a pressurized fluid source operatively connected through a control means to a load. The load usually is suitably connected to an exhaust means which may discharge spent fluid from the system or return it to the source for recirculation through the system. Generally, the control means includes a flow regulating valve and means for indicating the rate of fluid flow through the load.

A system of the described type may comprise, for example, a calorimetric measuring system having a fluid reservoir suitably connected to a constant displacement pump. The pump provides pressure generating means for maintaining a uniform rate of fluid flow through a control means and a connected calorimetric load. A typical load may comprise an electrical power consuming device thermally coupled to a chamber through which the fluid flows to an exhaust means. Thus, the temperature of the fluid adjacent the entrance and exit portions, for example, of the chamber may be measured to obtain a temperature differential which is a result of energy transmitted to the fluid from the electrically powered device under test. The temperature differential and the rate of fluid flow through the chamber yield a determination of the electrical power being consumed by the device under test.

The temperature differential initially obtained may be too low in value to yield a sufficiently accurate determination of the electrical power being consumed. However, by slowing the flow of fluid through the load, a greater quantity of energy will be transmitted from the device under test to each unit volume of fluid passing through the chamber. Thus, a higher temperature differential value may be obtained by adjusting the control means to decrease the rate of fluid flow through the calorimetric load. This decrease in flow rate, on the other hand, is not compatible with efficient operation of the constant displacement pump, which is designed to force a predetermined quantity of fluid per unit time through the control means. Therefore, attempts have been made to achieve compatibility by providing a control means suitable for adjusting the rate of fluid flow through the load and permitting efficient operation of the constant displacement pump.

Generally, prior art systems of the described type include a control means comprising a manifold arrangement having, in addition to the load outlet and associated control valve, at least one bypass outlet and associated bypass valve. The bypass outlet usually is suitably connected to a bypass line which may discharge excess fluid from the system or return it to the fluid reservoir for recycling. Thus, when the control valve is adjusted to decrease fluid flow through the load, the bypass valve may be adjusted to increase fluid flow correspondingly through the bypass line. The inverse adjustments of the control valve and the bypass valve should be accomplished simultaneously in order to avoid generation of excess pressure by the pump, which may rupture or otherwise damage the connecting fluid line. However, simultaneous adjustment of the two valves is difficult to accomplish without resorting to the use of sophisticated automatic equipment which increases the cost of the system prohibitively.

Therefore, it is advantageous and desirable to provide a fluid flow system of the described type with inexpensive control means for simultaneously varying the rate of fluid flow through the load and through a bypass line in a smooth transitional manner.

SUMMARY OF THE INVENTION

Accordingly, this invention provides a fluid flow system comprising a pressurized fluid source operatively connected through a uni-adjustment flow dividing and control means to a plurality of loads which are suitably connected to exhaust means.

The uni-adjustment flow dividing and control means includes a univalve device comprising a hollow housing having an inlet port and at least two outlet ports, each of the ports being provided with suitable means for mating with fluid conducting means. Movably supported within the housing is an adjustable member provided with a plurality of communicating channels. The channels are so located in the adjustable member that when one channel is disposed in communication with the inlet port, fluid will be distributed in a desired manner to each of the outlet ports. The adjustable member may be initially positioned such that fluid entering the inlet port will exit only from a preselected outlet port. A slight movement of the adjustable member in a predetermined direction causes a decrease in fluid flow from the preselected outlet port and a corresponding increase in fluid flow from the other outlet port thereby providing a smooth transition in the fluid flow pattern. Continued movement of the adjustable member in the same predetermined direction results in the preselected outlet port being closed off and full fluid flow being diverted to the other outlet port. Thus, the uni-adjustment flow dividing and control means provides continuous passage therethrough for fluid flowing from the pressurized source, even when closing off a preselected outlet port from the source. Consequently, the pressurized source is not presented with even a temporarily blocked passage whereby the resulting increase in fluid pressure may rupture or otherwise damage the interconnecting fluid lines.

A preferred embodiment of this invention includes a calorimetric measuring system having a pressurized fluid source comprising a fluid reservoir operatively connected to a pressure generating means, such as a constant displacement pump, for example. The pressure generating means is suitably connected to the inlet port of the uni-adjustment flow dividing and control means which comprises a univalve structure having two outlet ports. One of the outlet ports is operatively connected through a flow indicating means to an input portion of a calorimetric load which also is connected to a first temperature measuring means. An output portion of the calorimetric load is connected to a second temperature measuring means and also to an exhaust means which may include a heat exchanger for re-conditioning spent fluid before returning it to the fluid reservoir for recycling.

The other outlet port of the univalve structure is operatively connected through a bypass line to a simulated load which is suitably connected to an exhaust means. The simulated load aids in maintaining a uniform rate of fluid flow through the calorimetric load by preventing fluid surges through the bypass line. Basically, the simulated load may comprise a predetermined length of fluid conducting means which is restricted to cause a pressure drop approximately equal to the pressure drop in the calorimetric load. Thus, as the adjustable member of the univalve device is moved to vary the rates of fluid flow through the respective outlet ports, the calorimetric load and the simulated load vary accordingly with respect to the constant displacement pump. As a result, the combination of the calorimetric load and the simulated load represents a substantially constant total load to the pump, thereby providing optimum conditions for efficient operation of the pump.

BRIEF DESCRIPTION OF THE DRAWINGS

For a better understanding of this invention, the following more detailed description makes reference to the accompanying drawings wherein.

DESCRIPTION OF THE PREFERRED EMBODIMENT

Figure 1:
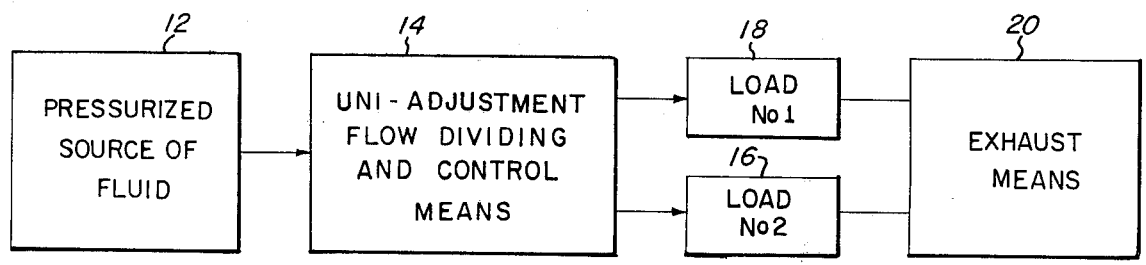
FIG. 1 is a block diagrammatic view of the fluid flow system of this invention.

Referring to the drawings wherein like characters of reference designate like parts throughout the several views, there is shown in FIG. 1 a fluid flow system 10 comprising a pressurized fluid source 12 operatively connected through a uni-adjustment flow dividing and control means 14 to a plurality of loads, such as respective loads 16 and 18, for example. The loads 16 and 18, respectively, are suitably connected to an exhaust means 20 which may discharge spent fluid from the system or return it to the source 12 for recycling.

Figure 2:
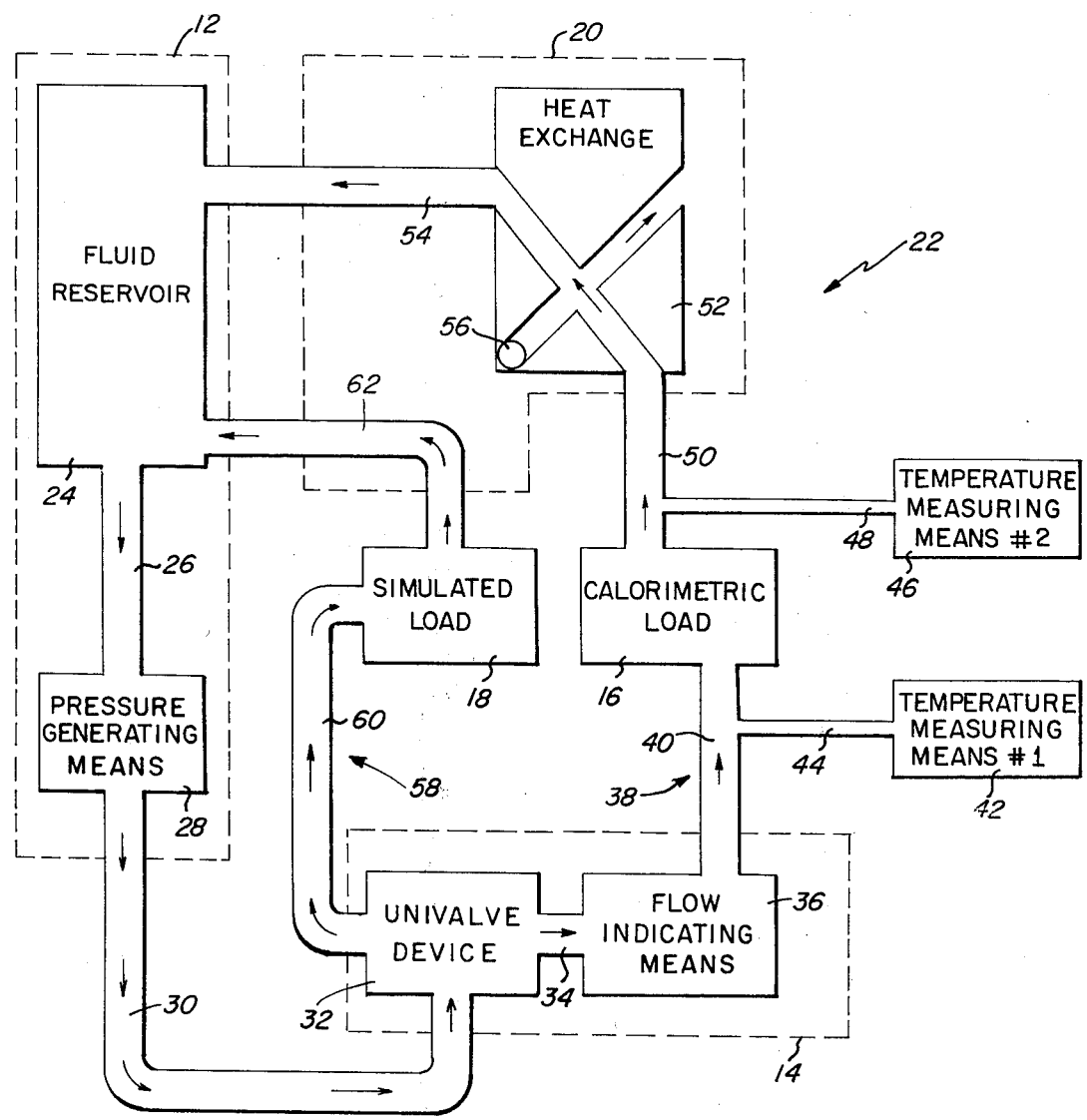
FIG. 2 is a block diagrammatic view of a calorimetric measuring system embodying the fluid flow system shown in FIG. 1.

As shown in FIG. 2, the fluid flow system 10 may be embodied, for example, in a calorimetric measuring system 22. The system 22 includes a pressurized fluid source 14 comprised of a fluid reservoir 24 suitably connected, as by conduit 26, for example, to a pressure generating means 28. The fluid in reservoir 24 may comprise a liquid, such as distilled water, for example; and the pressure generating means 28 may comprise a conventional type pump, such as a constant displacement pump, for example.

The pressure generating means 28 is operatively coupled, as by conduit 30, for example, to an inlet of a univalve device 32 which constitutes one component of a uni-adjustment flow dividing and control means 14. Operatively connected, as by conduit 34, for example, to one outlet of the univalve device 32 is a flow indicating means 36 which constitutes another component of the control means 14. Flow indicating means 36 may comprise a conventional type of flow indicator, such as a flow rate meter, for example, and is operatively connected to a working line 38. The working line 38 includes a calorimetric load 16 having an input portion suitably connected, as by conduit 40, for example, to the flow indicating means 36.

A first temperature measuring means 42 may be operatively coupled, as by a suitable conduit 44, for example, to the input portion of the calorimetric load 16. The first temperature measuring means 42 may comprise a conventional thermocouple device, for example, and provides a temperature measurement of fluid flowing into the calorimetric load 16. Calorimetric load 16 may comprise, for example, an electrically powered device thermally coupled to a chamber (not shown) through which the fluid flows. A second temperature measuring means 16 may be operatively coupled, as by a suitable conduit 48, for example, to an output portion of the calorimetric load 16. The second temperature measuring means 46 also may comprise a conventional thermocouple device, for example, and provides a temperature measurement of fluid flowing out of the calorimetric load 16. Thus, the first and second temperature measuring means, 42 and 48, respectively, yield a temperature differential which represents the thermal energy transmitted to the fluid passing through the calorimetric load 16.

Suitably connected, as by conduit 50, for example, to the output portion of calorimetric load 16 is an exhaust means 20 which may include a heat exchanger 52 and a return line 54, for examples. The heat exchanger may comprise a conventional type heat dissipating means, such as a length of suitable conduit provided with external radially extending fins (not shown), through which air may be forced at a rapid rate by a conventional blower 56, for example. The return line 54 generally comprises a suitable conduit for connecting the output of heat exchanger 52 to the fluid reservoir 16. Thus, the heat exchanger 52 serves to recondition spent fluid by removing thermal energy therefrom before the fluid is returned to the reservoir for recycling through the system 12.

The univalve device 32 also is operatively coupled to a bypass line 58 which includes a simulated load 18 having an input portion suitably connected, as by conduit 60, for example, to a second outlet of the univalve device 32. Preferably, the simulated load 18 provides a pressure drop approximately equal to the pressure drop produced by the calorimetric load 16. An output portion of the simulated load 18 is connected to a return line 62 which constitutes a component of the exhaust means 20. The return line 62 generally comprises a suitable conduit for connecting the output portion of simulated load 18 to the fluid reservoir 24. Thus, spent fluid flowing from the simulated load 18 is conducted via the return line 62 back to the fluid reservoir 24 for recycling through the system.

As shown in FIGS. 3–6, the univalve device 32 comprises a hollow housing 64 made of suitable rigid material, such as brass, for example, and having therein an open-ended cavity 66. Disposed in the surrounding walls of cavity 66 are suitably spaced orifices 67, 68 ad 69 which communicate with aligned ports 70, 71 and 72, respectively. The port 70 and aligned orifice 67 may be disposed in axial alignment with the open end of cavity 66 and serve as the inlet of univalve device 32. Accordingly, ports 71 and 72 in conjunction with aligned orifices 68 and 69, respectively, function as respective outlets which, preferably, have similar configurations and substantially equal cross-sectional sizes. The outlet ports 71 and 72, respectively, may be axially disposed in spaced opposing relationship with one another and located in a plane substantially perpendicular to the axial centerline of inlet port 70. Each of the ports 70–72 may be provided with respective fastening means, such as internal threads, for example, whereby connecting conduits, such as 30, 34 and 60, for example, may be affixed to the ports in a fluid-tight manner.

The open end of cavity 66 may be defined by a protruding neck portion 74 of the housing 64 which neck portion may be externally threaded for suitable engagement with a panel type mounting nut 76. Extending axially into the cavity 66 is an adjustable member 80 made of suitable rigid material, such as brass, for example. Adjustable member 80, preferably, comprises a rotatable shaft 82 having affixed to the inner end thereof a channelled ball 84. The ball 84 is disposed in symmetrically spaced relationship with the orifices 67-69 and is encased in suitable packing material 86, such as polytetrafluorethylene, for example, which provides a smooth bearing surface for the rotatable ball 84. The packing material 86 extends to the adjacent wall surfaces of cavity 66 and is provided with respective orifices 87, 88 and 89 which are disposed in axial alignment with the orifices 67, 68 and 69, respectively. Preferably, the orifices 87-89 have respective cross-sectional sizes substantially equal to the cross-sectional sizes of the aligned orifices 67–69, respectively, and terminate adjacent the ball 84 in internal diameters of axially aligned washers 90, 91 and 92, respectively. The washers 90–92 may be coated with a smooth material, such as polytetrafluorethylene, for example, and serve to prevent cold flow of the packing material 86 into the associated orifices 87-89 due to rotation of the ball 84.

Pressing firmly against the packing material 86 is a flat surface of a retaining washer 94 which encircles shaft 82 and has centrally disposed in its opposing surface an annular groove 96. The groove 96 is filled with suitable packing material 98, such as polytetrafluorethylene, for example, which provides a smooth bearing surface for the rotatable shaft 82. The packing material 98 is pressed firmly around the shaft 82 in a fluid-tight manner by a washer 100 which encircles shaft 82 and provides a bearing surface for an annular bushing 102 journalled into neck portion 74. A handle 104 is suitably secured, as by locking screw 106, for example, to an outer end portion of shaft 82 and is provided with a protruding tab 108 which extends toward the rim of neck portion 74. Projecting from the rim of neck portion 74 are angularly spaced pins 110 and 112, respectively, each of which engages the tab 108 when the handle 106 is rotated to an associated angular position.

The ball 84 is provided with a plurality of radially extending channels, such as 114, 115 and 116, for examples, which communicate with one another at the center of ball 84. Preferably, the channels 114-116 have respective cross-sectional sizes at least as large as the cross-sectional sizes of the orifices 67–69, respectively. Channel 114 may be disposed in ball 84 such that it is aligned with the axial centerline of shaft 82 and communicates with the inlet port 70 through the mutually aligned orifices 67 and 87, respectively. Consequently, when the ball 84 is rotated about the axial centerline of shaft 82, the channel 114 remains in communication with the inlet port 70 and serves as the inlet channel of ball 84. Accordingly, the channels 115 and 116 function as respective outlet channels which, preferably, have similar configurations and substantially equal cross-sectional sizes. The outlet channels 115 and 116, respectively, may be disposed in ball 84 at right angles to the inlet channel 114 and located in the plane of the opposing outlet ports 71 and 72, respectively. Thus, by rotating the ball 84 about the axial centerline of shaft 82, the outlet channels 115 and 116 may be moved into and out of communication with the respective outlet ports 71 and 72.

Figure 3:
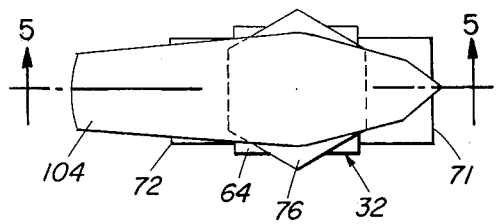
FIG. 3 is a plan view of one embodiment of the univalve means shown in FIG. 2.
Figure 4:
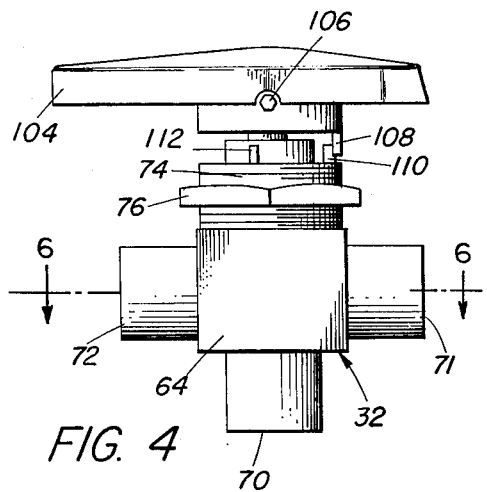
FIG. 4 is an elevational view of the univalve embodiment shown in FIG. 3.
Figure 5:
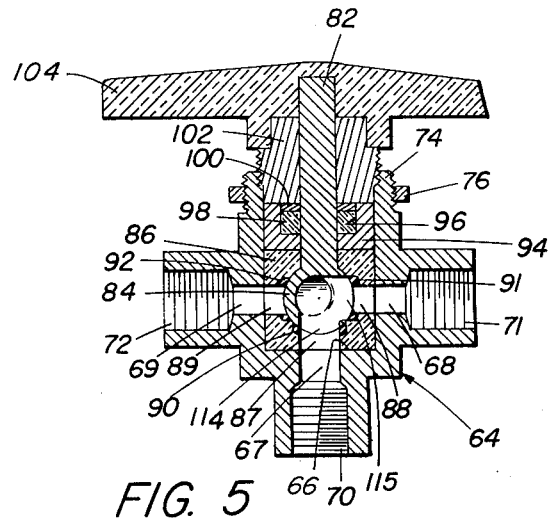
FIG. 5 is an axial sectional view taken along the line 5—5 shown in FIG. 3 and looking in the direction of the arrows.
Figure 6:
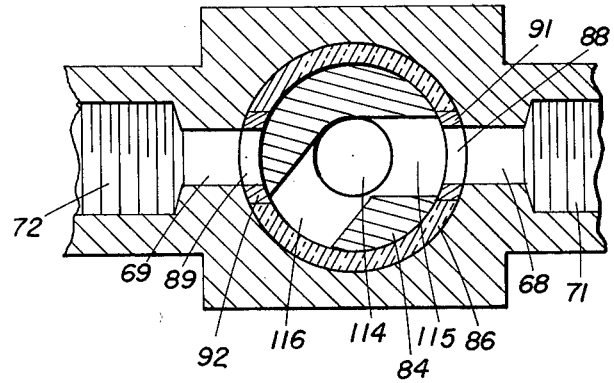
FIG. 6 is an enlarged cross-sectional view taken along the line 5—5 shown in FIG. 4 and looking in the direction of the arrows.
Figure 7:
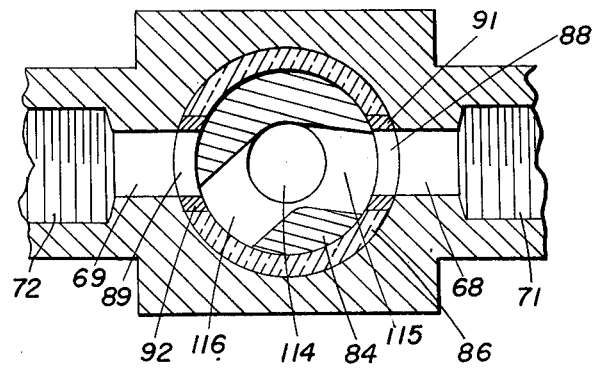
FIG. 7 is an enlarged cross-sectional view similar to the view shown in FIG. 6 but showing initial movement of the channelled member.
Figure 8:
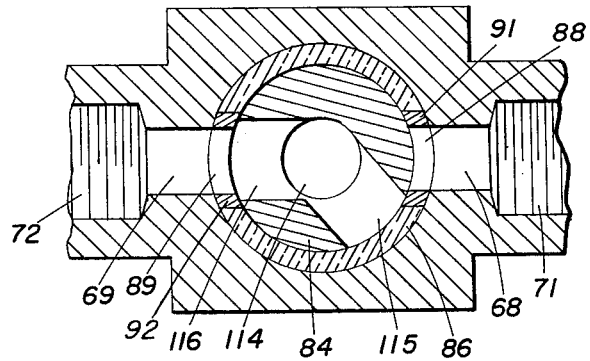
FIG. 8 is an enlarged cross-sectional view similar to the view shown in FIG. 7 but showing extreme movement of the channelled member.

Preferably, the outlet channels 115 and 116 are angularly disposed with respect to one another such that the channel 115 is positioned in full communication with the outlet port 71 when the channel 116 is positioned just out of communication with the outlet port 72, as shown in FIG. 6. With the channels 115 and 116 positioned as described, the protruding tab 108 of handle 106 is disposed in abutting relationship with the pin 110 projecting from the rim of neck portion 74, as shown in FIG. 4. When the indicating end of handle 106, as viewed in FIG. 3, is rotated slightly clockwise, the communication of channel 115 with outlet port 71 is reduced accordingly and channel 116 begins to communicate with the outlet port 72, as shown in FIG. 7. Continued rotation of handle 106 in the clockwise direction further restricts the communication of channel 115 with outlet port 71 and increases the communication of channel 116 with outlet port 72 correspondingly. Midway between extreme rotational positions of handle 106, as represented by projective pins 110 and 112, respectively, the communication of channel 116 with outlet port 72 is substantially equal to the communication of channel 115 with outlet port 71. When the protruding tab 108 of handle 106 abuts the pin 112 projecting from the rim of neck portion 74, the channel 116 is disposed in full communication with outlet port 72 and the channel 115 is disposed in a position just out of communication with outlet port 71, as shown in FIG. 8.

Thus, in the operation, the channel 115 initially may be disposed in full communication with the outlet port 71, as shown in FIG. 6. Consequently, all of the fluid entering the inlet port 70 will pass through the inlet channel 114 and the outlet channel 115 to exit through the outlet port 71. As a result, the entire quantity of fluid delivered per unit time by the pressure generating means 28 to the univalve device 22 will flow through the working line 38 and pass through the calorimetric load 16. If the first and second temperature measuring means, 42 and 46, respectively, provide a temperature differential value which is too low to achieve accurate results, the rate of fluid flow through the calorimetric load 16 may be decreased, as desired, by adjusting the handle 106 of univalve device 22. By rotating the handle 106 clockwise, as described, some of the fluid entering the inlet port 70 and flowing through the inlet channel 114 will pass through the outlet channel 116 to exit through the outlet port 72. The fluid thus diverted to the outlet port 72 will flow through the bypass line 58 and pass through the simulated load 18. Accordingly, the univalve device 32 provides uni-adjustment flow diverting means whereby the pressure generating means 28 is allowed to maintain a uniform rate of fluid flow through the univalve device 32.

Figure 9:
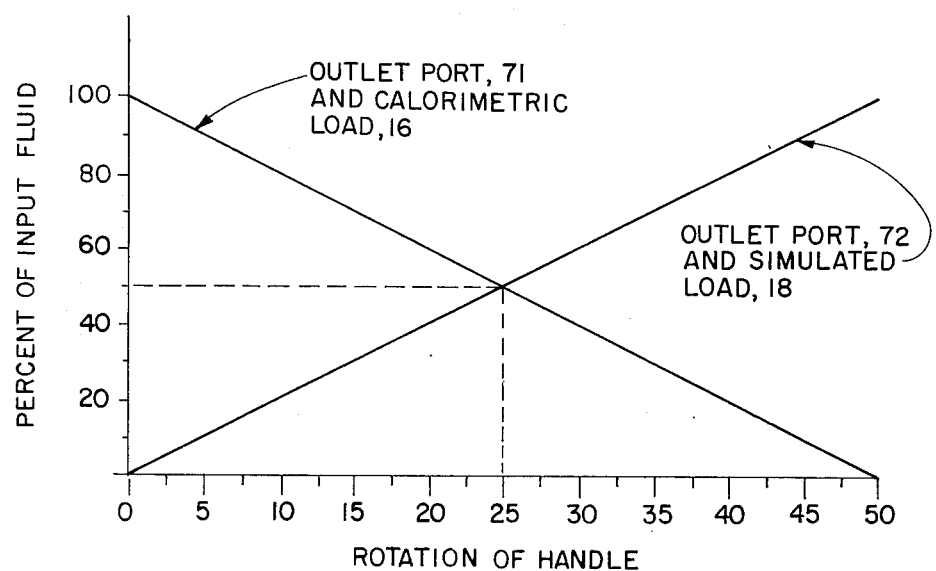
FIG. 9 is a graph showing percentage of input fluid for each load versus rotation of handle.

As shown in FIG. 9, before handle 106 is rotated from its initial position shown in FIG. 6, substantially all of the fluid entering inlet port 70 from the pressure generating means 28 exits through outlet port 71 and passes through the connected calorimetric load 16. Consequently, substantially no fluid flows initially through the outlet port 72 and the connected simulated load 18. However, a slight rotation of handle 106 in the clockwise direction, as viewed in FIG. 3, causes an associated reduction in the rate of fluid flow through outlet port 71 and a corresponding increase in the rate of fluid flow through outlet port 72. At the midpoint of angular rotation, such as twenty-five degrees in the clockwise direction, for example, substantially equal quantities of fluid per unit time flow through the respective outlet ports 71 and 72. Full angular rotation of handle 106 in the clockwise direction results in substantially all of the fluid entering inlet port 70 being directed through the outlet port 72 and no fluid flowing through the outlet port 71. Accordingly, the univalve device 22 functions not only as a flow dividing means but also as a control means for closing off the calorimetric load 16 from the source 14 while maintaining a continuous passage open through the device for pressurized fluid flowing from the source.

In light of the above discussion, it may be readily seen that rotation of handle 104 in the reverse angular direction, that is, counterclockwise, causes the rate of fluid flow through the outlet port 71 to increase and the rate of fluid flow through the outlet port 72 to decrease correspondingly. Accordingly, the univalve device 22 provides a uni-adjustment flow dividing means for inversely varying the respective rates of fluid flow through the calorimetric load 16 and through the simulated load 18 in a smooth transitional manner. As a result, adjustment of the univalve device 32 does not cause even a temporary blockage of fluid flow from pressure generating means 28, but instead assures that a continuously open passage will be maintained for the fluid to flow through the device 32. Thus, the univalve device 22 provides means for operating the pressure generating means 28, such as a constant displacement pump, for example, a peak efficiency while varying the rate of fluid flow through the calorimetric load 16. Consequently, the pressure generating means 28 may be permitted to continue delivering a constant quantity of fluid per unit time to the inlet port 70 of univalve device 22, even when the rate of fluid flow through the calorimetric load 16 is being reduced substantially to zero.

Figure 10:
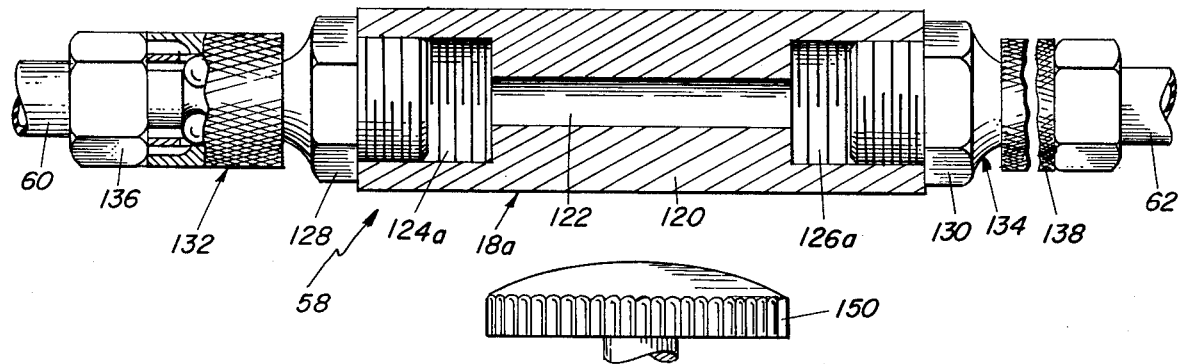
FIG. 10 is an axial view, partly in section, of a fixed type of simulated load.

In order to minimize the possibility of oscillatory surges occurring in the bypass line 58, it is preferred that the simulated load 18 provide a fluid pressure drop substantially equal to the pressure drop produced by the calorimetric load 16 in working line 38. Accordingly, as shown in FIG. 10, a simulated load 18a may comprise a conduit 120 having therein a restricted fluid passage 122 of predetermined length and reduced cross-sectional size as compared to the fluid passages in connecting conduits 60 and 62, respectively. The restricted passage 122 terminates at opposing ends thereof in respective recessed ports 124a and 126a which are disposed in opposing ends of the conduit 120. Conduit 120 may be made of suitable rigid material, such as brass, for example; and the recessed ports 124a and 126a may be provided with respective fastening means, such as internal threads, for example. Journalled into the recessed ports 124a and 126a are respective male fittings 128 and 130 of conventional quick-disconnect couplings 132 and 134, respectively. The male fittings 128 and 130 are mated, in a well-known manner, with respective female fittings 136 and 138 of the quick-disconnect couplings 132 and 134, respectively. The female fittings 136 and 138, respectively, are suitably secured, as by adhesive bonding, for example, to adjacent end portions of the connecting conduits 60 and 62, respectively. The conduits 60 and 62 may conveniently comprise respective lengths of flexible tubing which may be readily connected to and disconnected from suitable simulated loads, such as 18a, for example.

Figure 11:
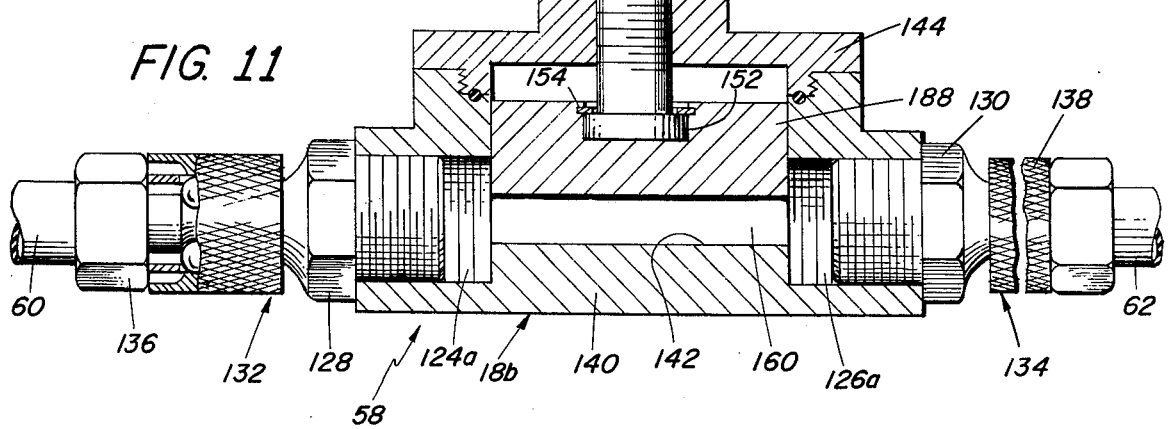
FIG. 11 is an axial view, partly in section, of a variable type of simulated load.

A simulated load of the fixed type, such as 18a, for example, generally is designed to produce a specific pressure drop suitable for counterbalancing a particular type of calorimetric load. However, the simulated load 18 also may be of the variable type, such as 18b shown in FIG. 11, for example. Simulated load 18b comprises a hollow housing 140 having therein an open-ended cavity 142 which is closed by a cap 144 journalled into the open end of the cavity. Extending through cap 144 is a centrally disposed bore 146 through which is journalled a threaded shaft 148 carrying on its outer end a knurled knob 150 and on its inner end a radially extending flange 152. The flanged end of shaft 82 is rotatably retained, as by locking ring 154, for example, within a recess 156 which is provided in an adjacent surface of a plug 158. Plug 158 slidably engages the walls of cavity 142 and has an opposing surface which cooperates with the bottom surface of cavity 142 in forming a fluid passageway 160. Opposing ends of the passage 160 communicate with respective recessed ports 124b and 126b which are disposed in opposing ends of housing 140.

As described previously, the recessed ports 124b and 126b may be internally threaded to receive respective male fittings 128 and 130 of conventional quick-disconnect couplings 132 and 134, respectively. The male fittings 128 and 130 mate, in a well-known manner, with respective female fittings 136 and 138 which are suitably secured to adjacent end portions of connecting conduits 60 and 62, respectively. Thus, it may be seen that rotation of knob 150 causes the slidable plug 158 to move toward or away from the bottom surface of cavity 142, as desired, thereby varying the cross-sectional size of the fluid passageway 160 to provide a required pressure drop. In this manner, the simulated load 18b may be adjusted to counterbalance various types of calorimetric loads which may be connected into the working line 38.

From the foregoing, it will be apparent that all of the objectives of this invention have been achieved by the structures shown and described. It also will be apparent, however, that various changes may be made by those skilled in the art without departing from the spirit of the invention as expressed in the appended claims. It is to be understood, therefore, that all matter shown and described is to be interpreted as illustrative and not in a limiting sense.

I claim:

1. A calorimetric system comprising:
a source of pressurized fluid;
a pair of loads, at least one of which is a calorimetric load disposed to receive a flow of fluid therethrough from the source;
fluid conducting means for connecting the source to the respective loads;
temperature measuring means thermally coupled to the calorimetric load for detecting a change in fluid temperature due to the calorimetric load;
flow dividing means connected between the source and the pair of loads and including a rotatable member for simultaneously and correspondingly varying the rates of fluid flow through the respective loads in a smooth transitional manner, the rotatable member having therein at least three internal communicating channels disposed continuously in communication with the source of pressurized fluid, each of the channels being provided with respective wall means for directing a smooth uniform flow of fluid through the flow dividing means; and
flow rate measuring means connected between the flow dividing means and the calorimetric load for determining the rate of fluid flow through the calorimetric load.

2. A calorimetric system as set forth in claim 1 wherein the flow dividing includes a univalve device comprising a hollow housing having an inlet port coupled to the source of pressurized fluid and two angularly spaced outlet ports, each of which is connected through the fluid conducting means to a respective load, the univalve device also including a ball member rotatably mounted in the housing and having the internal channels radially disposed therein including a first radial channel disposed in continuous communication with the inlet port.

3. A calorimetric system as set forth in claim 2 wherein the two angularly spaced outlet ports are disposed in a common plane orthogonal to the inlet port, one of the outlet ports being connected to the calorimetric load and the other being connected to a load having an equivalent resistance to fluid flow; and the internal channels include second and third radial channels disposed in communication with the first radial channel at the center of the ball and disposed in the common plane for rotation into registration with the respective outlet ports of the device.

4. A calorimetric system as set forth in claim 3 wherein the internal communicating channels include means for inversely varying communication between the inlet port and the outlet ports connected to the calorimetric load and the equivalent load, respectively, such that a change in fluid flow through the calorimetric load produces a corresponding opposite change in fluid flow through the equivalent load.

5. A calorimetric system as set forth in claim 4 wherein the second and third radial channels are spaced apart in the common plane a sufficient angular distance to provide full communication between the inlet port and one of the outlet ports when communication between the inlet port and the other outlet port is closed off.

* * * * *